United States Patent [19]
Adkins et al.

[11] Patent Number: 5,382,463
[45] Date of Patent: Jan. 17, 1995

[54] DATA STORAGE MEDIA

[75] Inventors: Kelvin P. Adkins, Essex; Duncan E. Riddle, Suffolk, both of England

[73] Assignee: Imperial Chemical Industries plc, London, United Kingdom

[21] Appl. No.: 897,144

[22] Filed: Jun. 11, 1992

[30] Foreign Application Priority Data

Jun. 11, 1991 [GB] United Kingdom ................ 9112505
Jun. 11, 1991 [GB] United Kingdom ................ 9112514
Jun. 11, 1991 [GB] United Kingdom ................ 9112515
Jan. 13, 1992 [GB] United Kingdom ................ 9200634

[51] Int. Cl.⁶ ............................................. B32B 3/00
[52] U.S. Cl. ..................... 428/141; 428/147; 428/327; 428/409; 428/411.1; 428/480; 428/483; 428/500; 428/522; 428/689; 369/283
[58] Field of Search ................. 428/64, 141, 143, 147, 428/206, 327, 409, 323, 480, 694 TR, 694 BR, 694 SG, 694 SL, 411.1, 483, 500, 522, 689; 369/283; 360/134

[56] References Cited

U.S. PATENT DOCUMENTS

| | | | |
|---|---|---|---|
| 3,840,448 | 10/1974 | Osborn | 204/159.14 |
| 4,198,458 | 4/1980 | Mitsuishi et al. | 428/212 |
| 4,348,446 | 9/1982 | Mitsuishi et al. | 428/148 |
| 4,590,119 | 5/1986 | Kawakami et al. | 428/216 |
| 4,670,340 | 6/1987 | Isobe et al. | 428/339 |
| 4,699,845 | 10/1987 | Oikawa et al. | 428/480 |
| 4,732,814 | 3/1988 | Hatada et al. | 428/480 |
| 4,963,402 | 10/1990 | Wong | 428/1 |
| 5,047,278 | 9/1991 | Ono et al. | 428/141 |
| 5,096,784 | 3/1992 | Culbertson et al. | 428/482 |
| 5,215,804 | 6/1993 | Hagens et al. | 428/156 |

FOREIGN PATENT DOCUMENTS

| | | |
|---|---|---|
| 0086474 | 8/1983 | European Pat. Off. . |
| 0235914 | 9/1987 | European Pat. Off. . |
| 0242949 | 10/1987 | European Pat. Off. . |
| 0315836 | 5/1989 | European Pat. Off. . |
| 0352901 | 1/1990 | European Pat. Off. . |
| 2807147 | 9/1978 | Germany . |
| 1591582 | 6/1981 | United Kingdom . |
| 2113117 | 7/1985 | United Kingdom . |

OTHER PUBLICATIONS

Database WPIL, Week 9027, Derwent Publications Ltd., London, GB; AN 90-206911 (27) & JP-A-2 139 731 (Sanyo Electric K.K.) 29 May 1990.
Database WPIL, Week 8414, Derwent Publications Ltd., London, GB; AN 84-086150 (14) & JP-A-59 011 098 (Teijin K.K.) 13 Mar. 1984.
Database WPIL, Week 9027, Derwent Publications Ltd. London, GB; AN 90-206910 (27) & JP-A-2 139 729 (Sanyo Electric K.K.) 29 May 1990.
Derwent Abstract Accession No. 82-18639E/10 "Polyester Film with Excellent Surface Sliding Properties Obtained by Coating Film with Aq. Compsn. of Acrylate, Polyethylene Glyco and Glycidyl Ether, Stretching and Heat-Treating" JP 57018254-A (Jan. 30, 1982) JP 88028097-B (Jun. 7, 1988) Teijin KK.
Derwent Abstract Accession No. 83-750583/35 "Biaxially Stretched Slidable Polyester Film Manufactured by Coating Surface of Running Polyester With Aq. Soln. or Dispersion of Metal Salt and Film Forming Polymer or Monomer" JP 58124620-A (Jul. 25, 1983), JP 89044207-B (Sep. 26, 1989) Teijin KK.
Michael G. Mais, "Surface Texturing of UV Curable Coatings", Radcure '84 Conference Technical Paper, Sep. 10–13, 1984, Atlanta, Ga.

Primary Examiner—Patrick J. Ryan
Assistant Examiner—Marie R. Macholl
Attorney, Agent, or Firm—Cushman Darby & Cushman

[57] ABSTRACT

Optical recording tape has a backcoat providing a surface texture designed to impart high static friction between the opposite faces of the tape to enable the tape to maintain pack integrity during storage and transport.

4 Claims, 2 Drawing Sheets

DATA STORAGE MEDIA

FIELD OF INVENTION

This invention relates to data storage media of the type produced in the form of tape which can be wound onto a spool from which it can subsequently unwound. In recent times, interest has been aroused in optical recording media in which data is stored by interaction of a laser beam, focused for example to a spot size of the order of 1 micron or less, with a recording layer sensitive to the laser radiation. The recording in such media may be effected in various ways; for instance, by laser induced deformation or ablation of the recording layer or by laser induced changes of phase in the recording layer material, eg, between amorphous and crystalline states. Because the deformation, phase change or other laser induced marking of the recording layer can be confined to an area of the order of 1 micron or less, the potential storage capacity of optical recording media can be very large.

SUMMARY OF THE INVENTION

According to one aspect of the present invention there is provided an optical tape recording medium in which the static coefficient of friction $\mu s$ between opposite faces of the tape is at least 0.6.

Preferably $\mu s$ is at least 0.8 and more preferably at least 1.0, typically within the range 1.2 to 10 and especially 1.2 to 3.2. The values of $\mu s$ specified here and elsewhere in this specification refer to the medium prior to recording of data thereon.

By producing the tape so that it has a static coefficient of friction which is relatively high, we have found that the wound tape is less susceptible to layer to layer slippage as a result of shock loads and/or temperature variations during transport and tape relaxation during storage. Conventionally, with magnetic tapes it has been necessary to carry out a tape rewind operation periodically in order to retension the tape and ensure that the interlayer pressures are maintained at levels such that interlayer slippage does not occur. Although the present invention does not necessarily eliminate the need for periodic rewinding of the tape to compensate for tape. relaxation, the intervals between rewinds may be substantially increased. Moreover, because the forces that cause layer to layer slippage are related to $\mu s$, the use of higher values for $\mu s$ than those conventionally used in magnetic tapes means that the wound tape pack can withstand greater forces before slippage occurs.

The necessary static friction between the opposite faces of the tape may be obtained in different ways; for example, one or both of the surfaces that come into contact when the tape is wound onto a spool may have surface texture or roughness (herein referred to generically as surface texture) imparted thereto or one surface may be substantially smooth and the other may have surface texture imparted thereto. In the latter case, the substantially smooth surface may have a surface energy which enhances $\mu s$. The textured surface may likewise have a surface energy which enhances $\mu s$.

According to a second aspect of the invention there is provided an optical tape recording medium for use with a laser recording beam having a given wavelength, said medium comprising a substrate in the form of a tape, a layer of optical recording material applied to one face of the tape, optionally an overcoat layer overlying the recording layer and a backcoat layer applied to the opposite face of the tape, the static coefficient of friction $\mu s$ between the backcoat and the recording layer (or the overcoat layer if present) being at least 0.6.

Preferably at least the backcoat layer has a surface texture comprising troughs and peaks, the peaks of which contact the recording layer or overcoat layer when the tape is wound onto a spool. Where the backcoat layer contacts the recording layer directly, it will be appreciated that the recording layer will need to be sufficiently robust to permit this: for example, in this event, the recording layer may be composed of, or incorporate, a cross-linked polymeric component which may be a binder used in conjunction with a dye or a polymeric dye.

Although we do not exclude the possibility of imparting surface texture by means of coated layers filled with particulate material as commonly used in magnetic media, it is preferred that the surface texture is imparted primarily by the morphology of the coating material per se rather than by any particulate contained in the coating material. Where the surface texture is imparted by the morphology of the coating material, we do not exclude the possibility of the coating material containing a particulate constituent but this will tend to be present for example as a nucleating agent to assist in obtaining the textured surface and will not contribute significantly in terms of imparting the texture.

Where an overcoat layer is provided, it may have a thickness corresponding at least approximately to the $\frac{1}{4}$ wavelength thickness: preferably however the overcoat layer is substantially thinner than the $\frac{1}{4}$ wavelength thickness, usually by a factor of at least 50% and, more preferably, at least 100%. Advantageously, where the wavelength of laser radiation used to write into the recording layer is of the order of 700–1,000 nm, e.g. 830 nm the overcoat layer is less than 100 nm thick and may be less than 60 nm thick.

By $\frac{1}{4}$ wavelength thickness, we mean a thickness corresponding to lambda/2 n where lambda represents said given wavelength of laser radiation to which the recording layer is sensitive, and n is the refractive index of the overcoat layer at that wavelength.

In some cases, we envisage that the overcoat layer may be so thin that it is actually breached or ruptured locally at each site of writing; e.g. the formation of each data pit in the recording layer by writing with a laser beam of appropriate wavelength is accompanied by breaching or rupturing of the overcoat layer immediately overlying the data pit (as described in our co-pending UK Patent Application No 91 12567.4).

Those surfaces of the optical tape which contact each other when the tape is wound onto a spool are preferably such that the bit error rate (BER) of the recording layer following initial recording thereof remains substantially constant after repeated winding and unwinding of the tape.

According to another aspect of the invention there is provided an optical recording medium in the form of a tape suitable for winding and unwinding from a spool, the tape having a recording layer on one face thereof, an optional overcoat layer overlying the recording layer and a backcoat layer on the opposite face of the tape whereby the backcoat layer comes into frictional contact with the opposite side of the tape when the tape is in the spooled form, the backcoat layer and the side of the tape so contacted having material compositions and surface morphologies such that the static coefficient of friction $\mu s$ is at least 0.6 and the bit error rate (BER) of the recording layer following initial recording of the tape increases by no more than $6 \times 10^{-4}$, preferably $4 \times 10^{-4}$ when the tape is subjected to, and preferably in excess of, $10^3$ winding passes.

There may be applications in which the optical recording medium is subjected to a small number of winding passes for example less than 2500 and, in some cases less than 1000. In such applications, a relatively large increase in the BER compared to the initial BER may be tolerated, particularly if the initial BER is very low.

However, it is preferred that following initial recording, the BER does not increase by more than 100% when the tape is subjected to, and preferably in excess of, $10^3$ winding passes.

According to yet another aspect of the invention there is provided an optical recording medium in the form of a tape suitable for winding and unwinding from a spool, the tape having a recording layer on one face thereof, an optional overcoat layer overlying the recording layer and a backcoat layer on the opposite face of the tape whereby the backcoat layer comes into frictional contact with the opposite side of the tape when the tape is in the spooled form, the backcoat layer and the side of the tape so contacted having material compositions and surface morphologies such that the static coefficient of friction $\mu s$ is at least 0.6 and the bit error rate (BER) of the recording layer following initial recording of the tape remains less than $8 \times 10^{-4}$ when the tape is subjected to, and preferably in excess of, $10^3$ winding passes.

DESCRIPTION OF PREFERRED EMBODIMENTS

Usually the tape will be provided with an overcoat layer; however, as previously indicated we do not exclude the possibility of the recording layer being sufficiently robust as to obviate the need for a protective overcoat layer. Where an overcoat layer is present, it may have a thickness of the dimensions mentioned previously.

Preferably the backcoat layer and the opposite tape surface so contacted will have compositions and surface morphologies such that the BER characteristic does not undergo an increase of $6 \times 10^{-4}$, 100% and/or does not exceed $8 \times 10^{-4}$ when the tape is subjected to, and preferably in excess of, $10^4$ (more preferably $5 \times 10^4$) winding passes.

Preferably $\mu s$ is at least 0.8 and more preferably at least 1.0.

By "winding pass" we mean winding of a sample of tape from one spool to the other and in accordance with the winding regime described hereinafter. "BER" refers to the ratio of correctly read data bits to the number of data bits resulting from initial laser writing.

Usually, the material compositions and surface morphologies of the overcoat and backcoat layers will be such that the BER remains within 50%, more preferably within 35% and most preferably within 20%, of its initial value when the tape is subjected to up to the number of winding passes specified above.

The substrate is typically a polymeric material.

Preferably the optical tape is of the type which is intended to be written and read by means of laser radiation transmitted through the overcoat layer, in which event the overcoat layer preferably has a substantially smooth morphology so that its thickness remains substantially uniform thereby eliminating the need for variation of focusing of the laser radiation to compensate for variation in overcoat thickness. In this instance, the backcoat will have a morphology imparting suitable surface texture to enhance the static coefficient of friction. The substantially smooth overcoat layer may nevertheless have properties which enhance $\mu s$ e.g. the overcoat layer may have a surface energy which serves to enhance $\mu s$ and this may be achieved for instance by avoiding the use of a slip agent in the overcoat composition or using such an agent sparingly therein. The backcoat likewise may have a surface energy which serves to enhance $\mu s$.

In preferred embodiments of the invention where the backcoat layer has a surface texture, the backcoat layer comprises a layer of cured material comprising at least one polymer wherein the surface texture is imparted primarily by the polymer or polymers per se.

Where the context admits, the terms "polymerisation" and "polymer" as used herein include reference to homo- and co-polymerisation and to homo- and co-polymers respectively and the term monomer herein includes reference to oligomer.

Thus, the surface texture is primarily imparted by the polymer(s) per se rather than by an inorganic filler. In this way, compared with conventionally used inorganic fillers, the peaks of the surface texture tend to be less angular, ie. the peaks tend to be relatively smooth and do not tend to present abrasion promoting discontinuities.

The surface texture may be induced at least in part and preferably primarily as a result of evaporation of a volatile vehicle from a coating composition containing said vehicle and the unpolymerised component(s).

Usually, the surface texture will be provided substantially entirely by the polymer(s) per se but, in some instances, the surface texture may involve a minor contribution from other sources. For example, as referred to more specifically hereinafter, the material may incorporate a nucleating agent the presence of which may contribute to the surface relief but only to a relatively insignificant extent.

The method of forming the backcoat preferably comprises coating the substrate with a solution or dispersion of material in a volatile liquid vehicle, drying the coating to remove the volatile vehicle, the material comprising at least one polymerisable component such that the drying process is effective to impart a surface texture to the dried layer formed by the coating of material, and curing the dried layer to retain said surface texture.

Usually the surface texture will comprise peaks and troughs distributed substantially uniformly over the entirety of the layer of material. Typically the average roughness ($R_a$ as measured using PERTHOMETER, a machine manufactured by Mahr of Germany for measuring surface roughness in a conventional manner by means of a stylus) is up to about 2 microns and more usually within the range 0.1-1.0 microns.

According to a further aspect of the present invention there is provided an optical tape recording medium comprising a substrate in the form of a tape, a layer of optical recording material applied to one face of the tape, an overcoat layer overlying the recording layer and a backcoat applied to the opposite face of the tape whereby the backcoat and overcoat layers contact one another when the tape is in spooled form, the backcoat layer and the overcoat layer each comprising organic polymeric materials, the overcoat layer being substantially smooth and the backcoat layer having a surface texture with an average roughness Ra in excess of 0.05 and preferably at least 1 micron imparted thereto substantially entirely by the morphology of the polymeric material per se, the polymeric materials comprising said overcoat and backcoat layers being such that the BER of the recording layer does not exceed $8 \times 10^{-4}$ after subjecting the recording tape to, and preferably in excess of, $10^3$ winding passes (more preferably $10^4$, and most preferably $5 \times 10^4$ winding passes).

The overcoat layer may have a thickness as described hereinbefore.

Preferably the average surface roughness Ra will not exceed about 2 microns and will usually be no greater than 1.0 micron.

The surface texture will usually be such that a major proportion. preferably substantially all, of the surface effects are formed by retraction of the component or at least one of the components of the coating and/or, where the coating comprises at least two components, phase separation between at least two of the said components.

Said polymer or polymerisable component may comprise a metal acrylate and/or methacrylate, or a monomer, or a combination thereof. To avoid unnecessary repetition, hereinafter the term "(meth)acrylate" will be used in place of the phrase "acrylate and/or methacrylate."

It is preferred that substantially no shrinkage of the coating as a result of a chemical process, for example polymerisation and cross-linking, occurs prior to the curing of the metal (meth)acrylate and/or monomer. If any such shrinkage of the coating occurs, it is preferred that it does not contribute substantially, in relation to the retraction and/or phase separation, to the surface effects of the coating.

Suitably, a major proportion, preferably substantially all of the surface effects of the coating are formed before the metal (meth)acrylate and/or monomer is cured.

By "monomer" is meant a true monomer and/or an oligomer/pre-polymer which can be UV, electron beam and/or thermally cured. The amount, structure, molecular weight and functionality of the monomer can influence the morphology and properties of the cured coating. The monomer can be selected to optimise the coating requirements for a particular application, such as surface roughness; optical properties, eg haze; mechanical properties, eg abrasion resistance; flexibility; adhesion; solvent/chemical resistance; and weatherability.

The monomer is suitably a UV-reactive species, and more preferably a compound having an acrylate functional group. Particularly suitable monomers include acrylate ester monomers, urethane acrylate oligomers and N-vinyl lactam monomers.

Preferred acrylate ester monomers include acrylate esters having a plurality of acrylate groups, with trimethylolpropane triacrylate (TMPTA), ethoxylated TMPTA (TMPTEOA), tripropylene glycol diacrylate (TPGDA), and dipentaerythritol monohydroxy pentaacrylate (DPEPA) being particularly preferred.

Preferred acrylate oligomers include polyester acrylates and epoxy acrylates, with oligomeric acrylate thioethers—for example TMPTA-[S-TMPTA]$_n$-S-TMPTA where n is 0 to 2 which is available from RBhm GmbH under the trade name PLEX 6696-0, and urethane acrylates, especially aliphatic urethane acrylate oligomers, being particularly preferred.

Preferred N-vinyl lactam monomers include N-vinyl pyrrolidone and N-vinyl caprolactam.

The monomer may also be a cationic cured epoxy compound—such as a cycloaliphatic di-epoxide, for example 3,4-epoxycyclohexylmethyl-3',4'-epoxycyclohexane carboxylate available under the trade name DEGACURE K126 from Degussa. In this case it is desirable that a cationic photoinitiator, such as a triarylsulphonium salt, is present.

A blend of acrylate ester monomer and/or acrylate oligomer and/or N-vinyl lactam monomer may also be used as the monomer, particularly a blend of DPEPA and PLEX 6696-0. A N-vinyl lactam monomer, if present in the blend, may suitably comprise up to 40% by weight and preferably no more than 30% by weight of the blend. If desired, a cationic cured epoxy compound may also be included in any blends of monomers.

As herein described and employed, the metal (meth)acrylate preferably comprises a multivalent metal ion, for example a transition metal ion such as zirconium, more preferably a divalent metal ion such as zinc, cobalt, nickel or copper. A metal acrylate is generally preferred to a metal methacrylate. A particularly preferred metal acrylate is zinc diacrylate.

The metal (meth)acrylate and/or monomer may conveniently be applied to the substrate in a coating medium comprising a solution or dispersion of the metal (meth)acrylate and/or monomer in a suitable volatile vehicle, particularly an organic solvent or dispersant medium. The volatile vehicle may then be removed, suitably by drying to evaporate the vehicle.

Suitable organic media include common solvents—for example acetone and tetrahydrofuran and preferably those which have a hydrogen bonding capability such as alcohols, particularly methanol.

Deposition of the metal (meth)acrylate and/or monomer solution or dispersion onto the polymeric substrate is effected by conventional film coating techniques—for example, by gravure roll coating, reverse roll coating, dip coating, bead coating, slot coating or electrostatic spray coating. The solution or dispersion is suitably applied in an amount such that the thickness of the applied layer when dried is of the order of 5 $\mu$m or less, more usually 0.5 to 4 $\mu$m.

The degree of surface texture obtained can be controlled by varying the rate of drying of the metal (meth)acrylate and/or monomer layer; for example rapid drying of, for example, zinc diacrylate (1 min at 100° C.) can produce a regular microcrystalline structure imparting texture and light scattering to the coated film.

As mentioned previously, a nucleating agent may be present in the coating composition and serves to provide sites in the substantially un-cured coating at which the metal (meth)acrylate or monomer can crystallise. A suitable nucleating agent may already be present, for example, in the metal (meth)acrylate or the monomer; for instance, commercially available grades of zinc diacrylate which have been investigated have been found to contain small quantities of a material which is insoluble in a suitable coating solvent for example methanol. Preliminary analysis has indicated that this material is partially polymerised zinc diacrylate and/or zinc stearate. When solutions of commercially available zinc diacrylate, for example, technical grade zinc diacrylate available from Röhm, are prepared in methanol some (of the order of 0.1% by weight compared to the amount of zinc diacrylate) of the higher molecular weight material remains suspended in solution for several days as a colloidal dispersion.

The colloidal component aids formation of surface texture, remains stable in the coating solution and may be uniformly distributed in the coated layer after drying.

Where a separate nucleating agent is employed, it may comprise a conventional nucleating agent such as silica, preferably amorphous silica, or carbon black, both available from Degussa under the trade names AEROSIL TT600 and PRINTEX XE2 respectively.

Once the solvent has been removed from the metal (meth)acrylate and/or monomer layer, it is necessary to cure the layer in order to fix the surface texture produced during the solvent removal regime. Suitable curing methods include polymerisation of the metal (meth)acrylate, for example by electron beam curing; thermal curing, preferably using thermal initiators, especially thermal free radical initiators such as inorganic or organic peroxides, for example benzoyl peroxide, azo compounds, for example 2,2'-azobisisobutyronitrile; but photopolymerisation is preferred.

Photopolymerisation is suitably achieved by exposing the solvent-free metal (meth)acrylate layer to high intensity ultra-violet (UV) light, for example using a mercury arc lamp, preferably a medium pressure mercury arc lamp, providing UV light having a wavelength of about 240 to about 370 nm and preferably 260 to 370 nm. UV-curing can be performed in air, or if required, for example to increase the curing rate, in an inert atmosphere such as nitrogen.

Initiation of photopolymerisation may be effected in the presence of a photoinitiator, wide range of which are commercially available for use in a system comprising a metal (meth)acrylate and/or a monomer. The photoinitiator is preferably incorporated in an amount ranging from 0.1 to 20%, more preferably 2 to 12% by weight of the total reactive components. Suitable photoinitiators include benzoins, benzoin alkyl ethers, benzil ketals, acetophenone derivatives, for example dialkyl acetophenones and di-chloro and tri-chloro acetophenones, and particularly IRGACURE 651 and IRGACURE 907 both of which are available from Ciba Geigy.

The coating composition preferably comprises both the monomer and the metal (meth)acrylate.

It will be understood that the monomer will be able to cure in the presence of the metal (meth)acrylate. The amount, structure, molecular weight and functionality of the monomer can influence the morphology and properties of the cured coating. The monomer can be selected to optimise the coating requirements for a particular application, such as surface roughness; optical properties, eg haze; mechanical properties, eg abrasion resistance; flexibility; adhesion; solvent/chemical resistance; and weatherability.

The amount of monomer in the coating composition can vary over a wide range, preferably from 0 to 95%, more preferably 60 to 90%, and particularly 66 to 85% by weight of the total reactive components.

When the coating composition comprises a metal (meth)acrylate, particularly zinc diacrylate, and a monomer, the metal (meth)acrylaze may separate out from the monomer to form a two-phase system, as the solvent is removed by for example drying. The morphology of the resulting surface coating is dependent on the ratio of the salt to the monomer can be described as a discontinuous metal (meth)acrylate phase or ionomeric phase embedded in a continuous polymeric phase. Depending upon the compatibility of the metal (meth)acrylate and the monomer, it is possible that some of the monomer may be incorporated in the ionomeric phase and/or that some of the metal (meth)acrylate may be incorporated in the polymeric phase.

The presence of a monomer in the coating formulation may also result in an improvement in the durability of the resulting surface textured coating.

In order to secure phase separation, the coating composition may also comprise a polymer component, in addition to the monomer and/or the metal (meth)acrylate, which suitably is substantially incompatible with at least one other component of the composition and preferably all of the components of the composition.

Suitable polymer components include high molecular weight (eg. 1000 to 5000, more preferably 3000 to 4000) epoxy polymers such as bisphenol A epichlorohydrin condensates for example EPIKOTE 1009, an epoxy resin available from Shell and cellulosic polymers for example cellulose acetate.

The amount of polymer component in the coating composition may vary over a wide range and is determined by the application for which the medium is required. The polymer component may be present in an amount of up to 90%, preferably 1 to 80% and especially 20 to 60% by weight of the total reactive components.

If desired, a supercoat may be applied to the surface textured coating of a medium according to the invention to provide protection therefor. In order to retain the benefit of the surface relief of the surface textured coating it is highly desirable that the supercoat follows the contours of the surface relief and is applied in a layer of substantially uniform thickness.

We have found that a supercoat having a low surface energy, preferably not more than 44 dyne/cm, more preferably not more than 36 dyne/cm and especially in the range 16 to 36 dyne/cm, is particularly advantageous. Such supercoats reduce the affinity between the supercoat of the recording medium and the opposite surface thereof.

Suitably the low surface energy supercoat comprises a hydrocarbon wax, a silicone polymer/prepolymer, desirably silicone (meth)acrylates—for example Ebecryl 1360 available from Union Carbide, and/or fluorinated polymers/prepolymers—for example 2,2,3,3 tetrafluoropropylmethacrylate available from Rohm GmbH.

The thickness of the supercoat will depend upon the application for which the medium is produced but is preferably in the range 1 nm to 2 $\mu$m and especially 1nm to 0.5 $\mu$m.

Prior to deposition of the surface textured coating medium onto the polymeric substrate the exposed surface thereof may be subjected to a surface-modifying treatment to provide a receptive layer thereon. The treatment may be chemical or physical, a convenient treatment, because of its simplicity and effectiveness, which is particularly suitable for the treatment of a polyolefin substrate, being to subject the exposed surface of the substrate to a high voltage electrical stress accompanied by corona discharge. Alternatively, the receptive layer may be created by pretreating the substrate with a medium known in the art to have a solvent or swelling action on the substrate polymer. Examples of such media, which particularly suitable for the treatment of a polyester substrate, include a halogenated phenol dissolved in a common organic solvent, for example a solution of p-chloro-m-cresol, 2,4-dichlorophenol, 2,4,5- or 2,4,6-trichlorophenol or 4-chlororesorcinol in acetone or methanol. In addition, and preferably, the treatment solution may contain a partially hydrolysed vinyl chloride-vinyl acetate copolymer. Such a copolymer conveniently contains from 60 to 98 per cent of vinyl chloride, and from 0.5 to 3% of hydroxyl units, by weight of the copolymer. The molecular weight (number average) of the copolymer is conveniently in a range of from 10,000 to 30,000 and preferably from 16,500 to 25,000.

A suitable receptive layer is formed by coating the polymeric substrate with a coating composition comprising an acrylic or methacrylic polymer, preferably comprising at least one monomer derived from an ester of acrylic acid, especially an alkyl ester where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer may be present in a proportion in the range 30 to 65 mole %, and the methacrylate monomer may be present in a proportion in the range of 20 to 60 mole Other monomers which are suitable for use in the preparation of the acrylic or methacrylic polymer, which may be used instead of, but are preferably copolymerised as optional additional monomers together with esters of acrylic acid and/or methacrylic acid, and derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid.

Other optional monomers include vinyl esters such as vinyl acetate, vinyl chloracetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred acrylic or methacrylic polymer derived from 3 monomers comprises 35 to 60 mole % of ethyl acrylate: 30 to 55 mole % of methyl methacrylate: 2–20 mole % of methacrylamide, and particularly in a ratio of 46/46/8 mole % respectively.

The molecular weight of a suitable acrylic or methacrylic polymeric component can vary over a wide range but the weight average molecular weight is preferably within the range 40,000 to 300,000, and more preferably within the range 50,000 to 200,000.

Another suitable receptive layer is formed by coating the polymeric substrate with a mixture of the aforementioned acrylic or methacrylic polymer and a styrene/butadiene copolymer. A preferred styrene/butadiene copolymer has a molar ratio of styrene:butadiene of approximately 1.4:1.0. A preferred acrylic or methacrylic polymer for mixing with the styrene/butadiene copolymer comprises methyl methacrylate/ethyl acrylate/methacrylamide, preferably in a ratio of 46/46/8 mole % respectively. The weight ratio of the styrene/butadiene copolymer to acrylic or methacrylic polymer can vary over a wide range, preferably from 1.0:0.1 to 10.0, more preferably from 1.0:0.25 to 4.0, and particularly 1.0:1.0.

A preferred receptive layer has a low surface energy which facilitates retraction of the surface textured coating composition to form the surface textured coating. Such a receptive layer suitably comprises any of the materials which may be employed in a low surface energy supercoat as herein described. Desirably such a receptive layer may chemically react with the surface textured coating to promote adhesion between the receptive layer and the surface textured coating and preferably comprises (meth)acrylate double bonds which react with (meth)acrylate groups in the surface textured coating for example when the said coating is cured.

If desired, a plurality of treatments may be sequentially applied to a substrate.

The treatment is suitably applied at a concentration or intensity which will yield a receptive layer having a dry thickness generally less than 1 μm, and preferably from 0.05 to 0.5 μm.

A polyester substrate, for example a polyethylene terephthalate film, may require one or more of the aforementioned surface treatments in order to obtain adequate adhesion of the surface textured layer to the substrate.

The substrate of the optical tape according to the invention may be formed from any synthetic, film-forming polymeric material. Suitable thermoplastics materials include a homopolymer or copolymer of a 1-olefin, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, eg terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, eg ethylene glycol, 1,3-propanediol, 1,4-butanediol, neopentyl glycol and 1,4-cyclohexanedimethanol. A polyethylene naphthalate, and particularly a polyethylene terephthalate film is preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British Patent GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and US-A-4008203, particularly suitable materials being those sold by ICI PLC under the Registered Trade Mark STABAR. Blends of these polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, isocyanate resins, epoxy resins, functionalised polyesters, polyamides or polyimides.

A polymeric film substrate for production of a medium according to the invention may be unoriented, or uniaxially oriented, but is preferably biaxially oriented. A thermoplastics polymeric substrate is conveniently biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilised by heat-setting under dimensional restraint at a temperature above the glass transition temperature thereof.

The coating composition forming the backcoat layer may be applied to a receptive surface of an already biaxially oriented, and preferably heat-set, film substrate. However, we do not exclude the possibility of applying said coating composition at other stages during the production of the substrate. eg. at an intermediate stage between the stretching stages referred to above.

The thickness of the substrate of a medium according to the invention may vary over a wide range, but generally will be up to 300, especially from 2 to 75 $\mu$m. The thicknesses of the respective layers deposited on the substrate are usually minor by comparison therewith. A medium according to the invention may therefore be expected to exhibit a total thickness of from about 5 to 310 $\mu$m, especially 10 to 260 $\mu$m.

One or more of the polymeric layers of a tape according to the invention may conveniently contain any of the additives conventionally employed in the manufacture of thermoplastics polymeric films. Thus, agents such as anti-static agents, dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the substrate and/or receptive layer(s) and/or surface textured backcoat layer, as appropriate.

The invention is illustrated by reference to the accompanying drawings in which.

Figure 1:
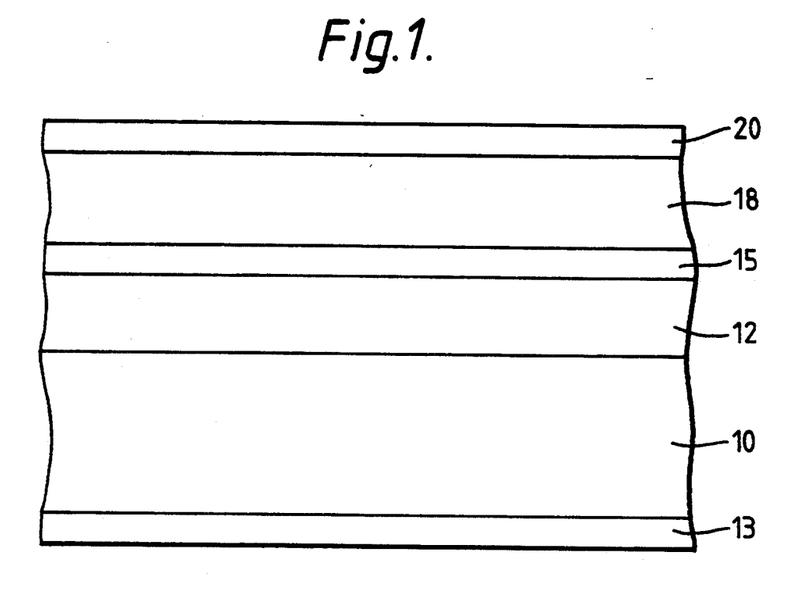
FIG. 1 is a diagrammatic sectional view through an optical recording medium having a backcoat applied thereto.

Referring to FIG. 1, the optical recording medium illustrated is in a form suitable for use as a flexible optical tape. However, it will be appreciated that the present invention is not limited to media of the optical tape type as shown in FIG. 1. The medium comprises a flexible substrate 10 which is coated on one face with a subbing or smoothing layer 12. The reverse face of the substrate is coated with a backcoat 13 which, in conventional tape recording media would incorporate inorganic filler particles, such as alumina, so as to impart a surface relief to the reverse side of the substrate. A thin layer 15 of material, eg. a suitable metal, is applied to the smooth surface of the subbing layer 12 to provide a surface which is highly reflective with respect to the wavelength used for writing into and reading from the medium. An amorphous recording layer 18 of a dye combined with a thermoplastic binder is solvent coated over the reflecting layer 15. A number of suitable dyes for use in the recording layer 18 are disclosed in our prior U.S. Pat. No. 4606859. The binder is typically an amorphous polyester thermoplastic resin. An overcoat layer 20 is superimposed on the recording layer 18, the overcoat layer being of a material which is highly transmissive to the laser radiation used for writing and reading the medium and which will be compatible with the reverse surface of the substrate and may also serve to protect the recording layer from the environment and from damage by for example abrasion. The substrate 10 may comprise for example a 75 micron or less thick film of MELINEX which is a biaxially orientated polyethylene teraphthalate film (MELINEX is a Registered Trade Mark of Imperial Chemical Industries PLC) and has sufficient flexibility to function, when coated with the layers 12, 15, 18 and 20, as a flexible optical tape medium which may be wound up on a spool in a similar manner to magnetic tape media. The dye is selected so as to have an absorption peak slightly shifted away from the reading and writing wavelength, typically 830 nm. The overcoat layer is typically composed of tough and hard material such as a radiation cured urethane acrylate or epoxy acrylate.

The recording medium shown in FIG. 1 is intended to be written into and read back using conventional techniques involving moving the medium relative to an optical recording head operable in writing or reading modes using a laser beam adjusted to higher or lower power levels according to the mode of operation, recording being effected with increased power and read back with reduced power. The laser beam is focused onto the recording layer 18 through the overcoat layer 20. Information may be represented digitally by using pit length (ie. the length of the pit in the direction of relative movement between the recording head and the medium) or pit position to store binary information and the information is read back by applying threshold techniques to detect the reflectivity variations caused by the presence of the pits.

In accordance with the invention, the backcoat and overcoat layers are such that the static coefficient of friction therebetween is somewhat in excess of that employed in conventional magnetic tape media so as to secure the advantages previously referred to in the context of reduced layer-to-layer slippage during tape storage and transport. Although we do not exclude such possibility, the surface relief provided by the backcoat in securing an appropriate $\mu$s is not afford by the inclusion of an inorganic filler incorporated in the backcoat composition; instead the required surface texture is imparted at least primarily by the morphology of the polymer(s) forming the backcoat.

The invention is further illustrated by the following Examples.

EXAMPLE 1

A polyethylene terephthalate film was melt extruded, cast onto a cooled rotating drum and stretched in the direction of extrusion to approximately 3 times its original dimensions. The cooled stretched film was then coated on both surfaces with an aqueous receptive layer composition containing the following ingredients:

| | |
|---|---|
| Acrylic resin (16% w/w aqueous based latex of methyl methacrylate/ethyl acrylate/methacrylamide: 46/46/8 mole %, with 25% by weight methoxylated melamine-formaldehyde) | 3.125 liters |
| LUDOX TM (50% w/w aqueous silica slurry of average particle size approximately 20 nm, supplied by Du Pont) | 0.43 liters |
| Ammonium nitrate (10% w/w aqueous solution) | 0.20 liters |
| SYNPERONIC N (27% w/w aqueous solution of a nonyl phenol ethoxylate, supplied by ICI) | 0.50 liters |
| Demineralised water | to 100 liters | the pH of the mixture being adjusted to 9.0 with dimetylamino ethanol (prior to the addition of the Lucox TM).

The receptive layer coated film was passed into a stenter oven, where the film was dried and stretched in the sideways direction to approximately 3 times its original dimensions. The biaxially stretched coated film was heat set at a temperature of about 200° C. by conventional means. Final film thickness was 75 μm, with a dry coat weight of approximately 0.3 mgdm$^{-2}$.

The textured surface backcoat layer was derived from coating compositions 1A to 1F as indicated below and was applied to the receptive layer by "bead" (meniscus) coating.

| | Composition (% w/w) | | | | | |
|---|---|---|---|---|---|---|
| | 1A | 1B | 1C | 1D | 1E | 1F |
| Zinc diacrylate | 0.56 | 1.4 | 2.23 | 3.07 | 3.90 | 1.50 |
| PLEX 6690-6 | — | — | — | — | — | 4.25 |
| SARTOMER 399 | 1.3 | 3.25 | 5.21 | 7.16 | 9.12 | 4.25 |
| IRGACURE 907 | 0.14 | 0.35 | 0.56 | 0.77 | 0.98 | 0.70 |
| Methanol | 98.0 | 95.0 | 92 | 89.0 | 86.0 | 89.3 |
| Total (% w/w reactive components) | 2.0 | 5.0 | 8.0 | 11.0 | 14.0 | 10.7 |

Zinc diacrylate supplied by Röhm: PLEX 6690-6 is an oligomeric acrylate thioether supplied by Röhm; SARTOMER 399 is a dipentaerythritol monohydroxy pentaacrylate supplied by Sartomer; IRGACURE 907 is 2-methyl-1-((4-methylthio)phenyl)-2-morpholino-propanone-1 supplied by Ciba Geigy.

The applied wet coating was approximately 12 μm thick and was dried in an oven at 100° C. for up to 20 seconds depending on line speed.

The dried coating was cured by one pass of the film at 24 meters per minute (mpm) for Examples 1A to 1E, 30 mpm for Example 1F under a pair of focused 118 W/cm (300 W/inch) UV lamps (microwave generated type H bulb Fusion Systems) in a nitrogen purged atmosphere.

Films 1C and 1F were thereafter coated on the opposite side of the substrate to the backcoat with identical layers comprising a reflective layer, a dye/polymer layer and an overcoat layer to form an optical recording element having the structure described in FIG. 1 but excluding the subbing layer. Each of films 1C and 1F were produced with overcoat layers of approximately 30 nm thickness, and samples of film 1C were also produced with a thickness of approximately 220 nm: these films are herein designated as $1C_{30}$, $1F_{30}$ and $1C_{220}$.

The overcoat formulation used for films 1C and 1F comprised:

| | REACTIVE COMPONENTS (% w/w) |
|---|---|
| 64.5 | EBECRYL 220 (UCB) hexafunctional aromatic urethane acrylate |
| 21.5 | EBECRYL 210 (UCB) difunctional aromatic urethane acrylate |
| 3.8 | EBECRYL 1360 (UCB) silicone acrylate |
| 3.4 | UVECRYL P115 (UCB) amino acrylate |
| 6.8 | IRGACURE 907 (Ciba Geigy) |
| | SOLVENT SYSTEM (% v/v) |
| 75 | Industrial methylated spirits |
| 20 | acetone |
| 5 | diacetone alcohol |

For the production of a thick overcoat (approx 220 nm), the coating solution comprised 3.75% w/v reactives to solvent and for the thin overcoat (approx 30 nm), it comprised 0.40% w/v reactives/solvent.

The properties of the cured films were assessed and the results are given in Table 1. Surface roughness was measured using a PERTHOMETER S6P surface measuring and recording instrument having a "free tracing system" and a datum pick-up No FTK 3-50 to measure the average roughness (Ra) and the average groove distance (Rsm) on the film under test.

TABLE 1

| | 1A | 1B | $1C_{220}$ | $1C_{30}$ | 1D | 1E | $1F_{30}$ |
|---|---|---|---|---|---|---|---|
| $R_a$ | 0.13 | 0.30 | 0.45 | 0.45 | 0.59 | 0.83 | 0.43 |
| $R_{sm}$ | 64 | 81 | 99 | 99 | 127 | 166 | 190 |
| μs | 0.96 | 0.61 | 0.87 | 1.03 | 0.81 | 0.95 | 2.45 |
| μd | 0.18 | 0.13 | 0.15 | 0.70 | 0.16 | 0.19 | 2.15 |

μs and μd respectively represent the static and dynamic coefficients of surface friction. Surface friction was determined using Lloyd JJ T5K "Tensile Tester" available from Instron Ltd. A sample of the film was laid on the base plate of the instrument with the surface textured coating face down and a second sample of the film was secured, with surface textured coating facing down, to a block having a weight exerting a downward force of 5.88N. The block was placed on the first-mentioned sample. The dwell time, that is the time for which the samples were in contact prior to the block being moved was about 10 seconds. A wire was attached to the block and the Tensile Tester was operated at a cross-head speed of 50 mm/minute. The force on the wire required to move the block with the samples in contact was measured by the load cell to give a static and a dynamic friction reading. The samples of film to be tested were allowed to equilibrate for one hour at a temperature of 20° C. and 60% Relative Humidity. In the case of Examples 1A, 1B, 1D and 1E, because these were not dye coated and overcoated, a sample of film 1C was laid on the base plate and samples of film 1A, B, D or E were secured to the block.

EXAMPLE 2

The procedure of Example 1 was repeated, with identical substrate and receptive layers, but the textured surface layer was derived from a coating composition comprising:

| | |
|---|---|
| SARTOMER SR368 (tris(2-hydroxyethyl) isocyanurate triacrylate supplied by Cray Valley Products) | 1.0% w/w |
| IRGACURE 907 | 0.7% w/w |
| Methanol | 98.9% w/w |

The applied wet coating was dried in an oven at 125° C. for 10 seconds to provide a dry coat weight of approximately 110 mg/m$^2$. The dried coating was cured by one pass of the film at 30 mpm under two focused 300 W/inch (118 W/cm) medium pressure mercury arc lamps (Fusion systems type H) in nitrogen. The cured coat thickness was approximately 0.7 μm.

The film was treated on the opposite side of the substrate to the back coat with a coating identical to that applied to the opposite side of the substrate in Examples 1C$_{30}$ and 1F$_{30}$.

The coating properties of the cured film were assessed and the surface roughness was measured as Ra 0.07 and Rsm<36 and the static coefficient of static friction was measured as 1.1 to 1.4.

EXAMPLE 3 (COMPARATIVE)

The procedure of Example 1 was repeated with an identical substrate and receptive layers but the textured surface layer was derived from a coating the following composition and contained a conventional filler (silica). The coating composition was formed by dispersing Aerosil R972 into a mill base formulation by bead milling for 40 mins.

The mill base formulation comprised:

| Component | % w/w |
|---|---|
| EBECRYL 5129 | 29.93 |
| Isopropyl alcohol | 29.93 |
| Methanol | 29.93 |
| AEROSIL R972 | 9.99 |
| Isocetyl stearate | 0.23 |

The mill base was slowly diluted with solvent plus photoinitiators to give a coating composition comprising:

| Component | % w/w |
|---|---|
| EBECRYL 5129* | 10.0 |
| AEROSIL R972 | 1.0 |
| Isocetyl stearate | 0.02 |
| IRGACURE 907 | 0.4 |
| UVECRYL P115* | 0.4 |
| Isopropyl alcohol | 3.0 |
| Acetone | 61.83 |
| Methanol | 19.25 |
| Diacetone alcohol | 4.1 |

EBECRYL 5129 (UCB) is a hexafunctional aliphatic urethaneacrylate; AEROSIL R972 (DeGussa) is a hydrophobic surface treated silica, average primary particle size −16 nm and BET surface area −110±20 m$^2$/g; UVECRYL P115 (UCB) is an aminoacrylate co-initiator.

The applied wet coat was approximately 12 microns thick and was dried in an oven at 80° C. for 40 seconds. The dried coating was cured by one pass of the film at 10 meters/min under a pair of focused 118 W/cm (300 W/inch) UV lamps (microwave generated type H bulb Fusion Systems) in a nitrogen purged atmosphere.

EXAMPLE 4

The film obtained in Example 3 (comparative) was treated on the uncoated side of the film to enable evaluation thereof as optical data storage media. The film was treated to provide an identical coating to that on the opposite side of the back coat of Example 1F$_{30}$. The overcoat was 30±5 nm thick in each case.

The film of Example 3 so prepared was found to have a surface roughness of 0.09 (R$_a$) and friction coefficients of 0.58 (μs) and 0.41 (μd).

The films of Examples 1F$_{30}$, 2 and 3 (comparative) were slit into 35 mm tapes and the wear characteristics of the two films were assessed by subjecting the tapes to the following winding regime. Initially the data is written along the length of the sample tape to be cycled, the data being written over a length of 9.8 meters. The data is read prior to any cycling to obtain a measure of the raw bit error rate. Data is read at selected locations within the written 9.8 m length, for example a number of 64 MByte files are read.

Figure 3:
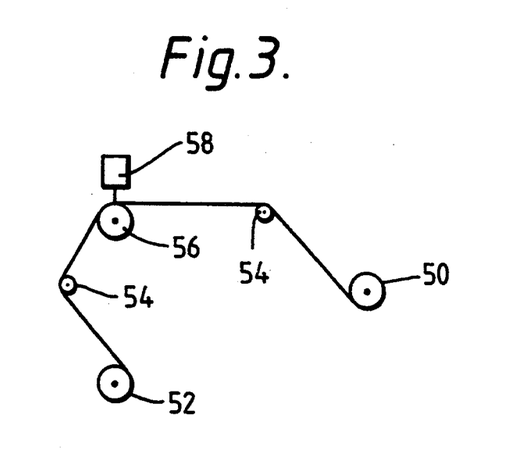
FIG. 3 is a diagrammatic illustration of the tape transport mechanism of an optical tape recorder used for testing purposes.

Using the transport mechanism of a CREO 1003 Optical Tape Recorder, as illustrated diagrammatically in FIG. 3, the tape was cycled from supply reel 50 to take up reel 52 via a path defined by idlers 54 and capstan 56, and then returned to the supply reel. Data is read by read/write head 58 located adjacent the capstan. The sample tape is transferred between the supply reel and the take-up reel at a constant speed of 3 m/sec. Each transfer of the tape from one reel to the other is a pass so that the tape undergoes two passes in the course of being unwound from the supply reel and then rewound back onto the supply reel. During transfer of the tape between the supply reel and the take-up reel, part of the data-bearing section of the tape is left unwound to ensure that some data remains stored in the supply reel thereby providing a control by accessing and reading the uncycled data at intervals throughout the test. After every 100 passes, the data is read in the cycled and "uncycled" regions and the BER determined.

The BER provides a measure of the ratio of correctly read data bits to the number of data bits resulting from initial laser writing.

Figure 2:
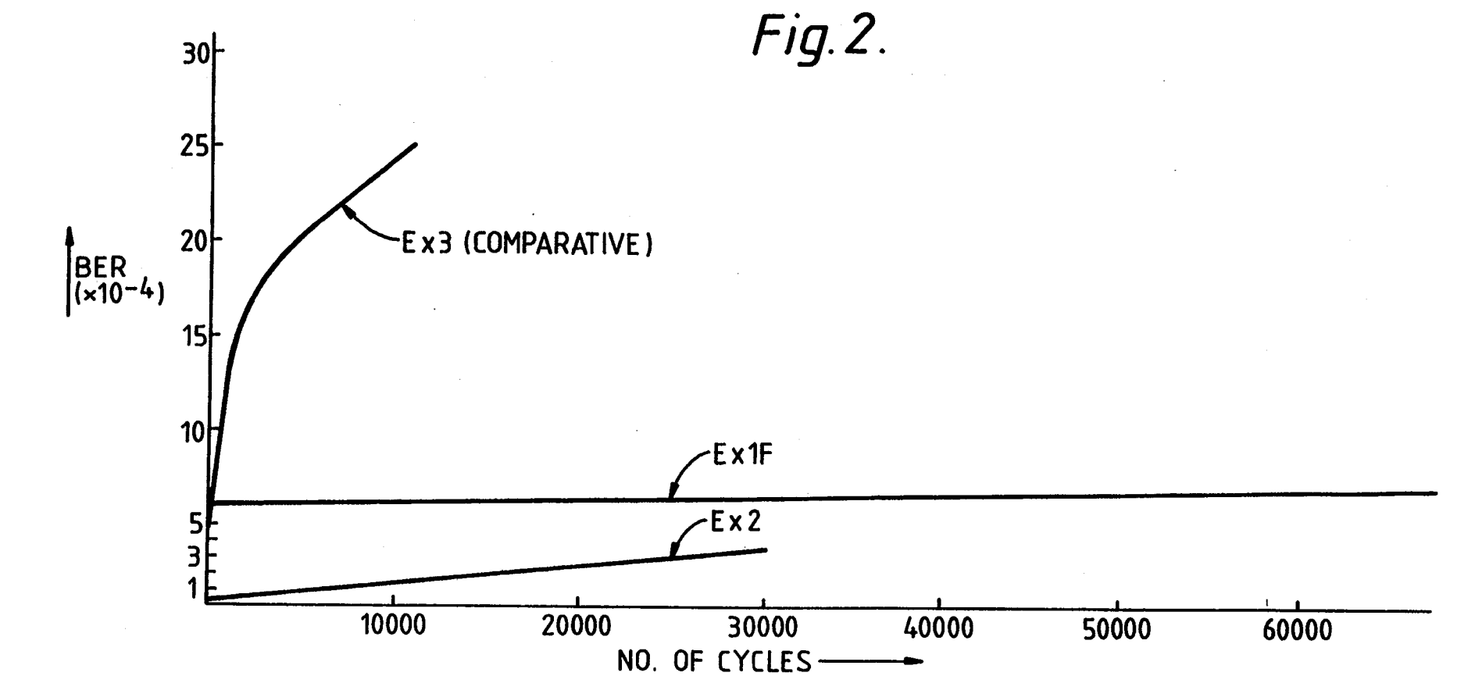
FIG. 2 is a graph illustrating the variation of BER with tape winding cycles for an optical tape having a backcoat in accordance with the invention and for a optical tape having a backcoat incorporating an inorganic filler.

The results of this test are indicated in Table 2 and by the graph of FIG. 2. The testing on the film of Example 3 was discontinued after 10000 passes in view of the high BER reached at that stage. Testing of the film of Example 1F$_{30}$ in contrast was continued beyond 60000 passes and still continued to give low BER's. This illustrates that, whilst a relatively high μs can be obtained by using a filled backcoat layer as in Example 3, the BER rapidly deteriorates upon repeated cycling; in contrast, using a non-filled backcoat layer as in Example 1F$_{30}$ and 2 provides a virtually constant BER with repeated cycling even when μs is much higher.

TABLE 2

| | BER/$10^{-4}$ | | |
|---|---|---|---|
| Cycles | Example 1F (thin) | Example 2 | Example 3 (Comparative) |
| 0 | 6.04 | 0.081 | 6.86 |
| 100 | — | 0.149 | 8.54 |
| 200 | — | 0.176 | 9.47 |
| 300 | — | 0.200 | 10.4 |
| 400 | — | 0.231 | 11.4 |
| 500 | 6.17 | 0.256 | 11.8 |
| 600 | — | 0.272 | 12.3 |
| 700 | — | 0.291 | 12.8 |
| 800 | — | 0.310 | 13.6 |
| 1000 | 6.18 | 0.334 | 14.4 |
| 1500 | 6.14 | 0.401 | 15.8 |
| 2000 | 6.27 | 0.449 | 16.5 |
| 2500 | 6.19 | 0.505 | 17.6 |
| 3000 | 6.17 | 0.546 | 18.5 |
| 3500 | 6.05 | 0.592 | 19.0 |
| 4000 | 6.05 | 0.635 | 19.6 |
| 4500 | 6.19 | 0.691 | 19.8 |
| 5000 | 6.19 | 0.745 | 20.3 |
| 5500 | 6.22 | 0.814 | 20.6 |
| 6000 | 6.08 | 0.865 | 21.1 |
| 6500 | 6.32 | 0.923 | 21.5 |
| 7000 | 6.20 | 0.988 | 21.8 |
| 7500 | 6.28 | 1.04 | 22.1 |
| 8000 | 6.35 | 1.11 | 22.5 |
| 8500 | 6.10 | 1.17 | 22.9 |
| 9000 | 6.30 | 1.23 | 23.6 |
| 9500 | 6.24 | 1.28 | 24.0 |
| 10000 | 6.27 | 1.32 | 24.4 |
| 20000 | 6.41 | 2.67 | — |
| 30000 | 6.61 | 3.80 (at 28000) | — |
| 40000 | 6.67 | | — |
| 50000 | 6.50 | | — |
| 60000 | 6.84 | | — |

We claim:

1. An optical tape recording medium comprising a substrate in the form of a tape, a layer of optical recording material applied to one face of the tape, an optional overcoat layer overlying the recording layer, and a backcoat layer applied to the opposite face of the tape whereby the backcoat and recording layer, or overcoat layer if present, contact one another when the tape is in spooled form, the backcoat layer and the overcoat layer, if present, comprising organic polymeric material substantially free of fillers, at least the backcoat layer having a surface texture with an average roughness Ra ranging from 0.1 to 2 microns imparted thereto substantially entirely by the morphology of the polymeric material such that the static coefficient of friction between the backcoat layer and the recording layer, or thee overcoat layer if present, is between 1.2 and 10 and the bit error rate (BER) of the recording layer does not exceed $8 \times 10^{-4}$ after subjecting the recording tape to $10^3$ winding passes.

2. An optical tape recording medium according to claim 1 in which the surface texture of the back coat layer comprises peaks and troughs distributed substantially uniformly over the entirety of the layer of material.

3. Optical tape recording medium according to claim 1 in which the backcoat layer comprises a metal acrylate or metal methacrylate.

4. An optical tape recording medium according to claim 1 which further comprises a supercoat overlying the backcoat layer, said supercoat having a low surface energy of not more than 44 dynes/cm.

* * * * *